Oct. 15, 1946.    A. L. PARKER    2,409,223
SUMP SELECTOR VALVE
Original Filed May 13, 1943
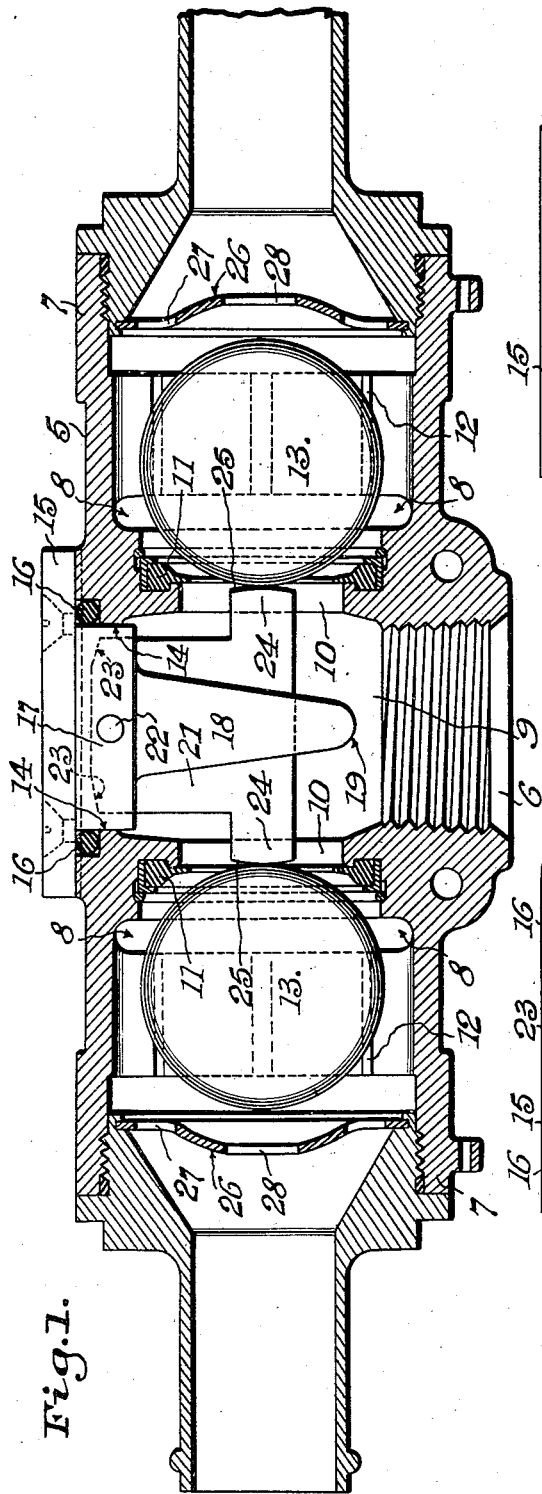
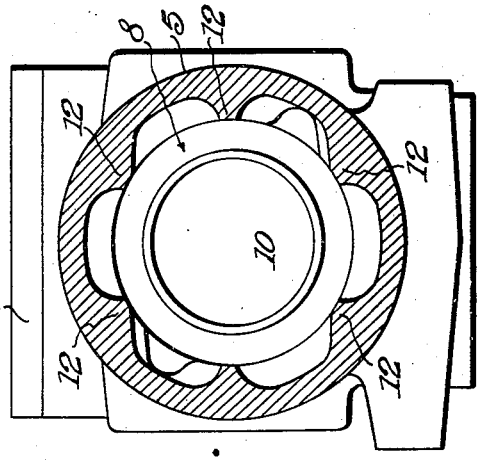
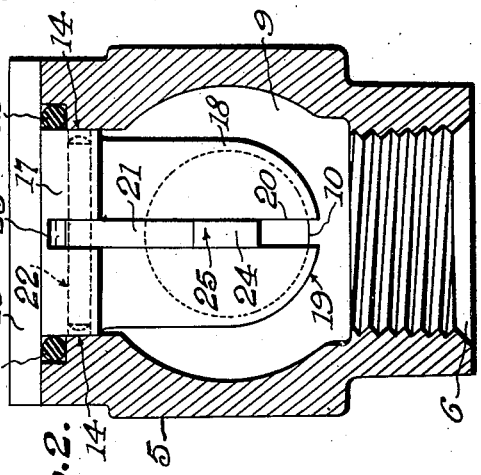
INVENTOR.
ARTHUR L. PARKER, Deceased
by HELEN M. PARKER, Executrix
BY
Mason, Porter, Diller & Stewart,
ATTORNEYS Patented Oct. 15, 1946

2,409,223

UNITED STATES PATENT OFFICE 2,409,223

SUMP SELECTOR VALVE

Arthur L. Parker, deceased, late of Shaker Heights, Ohio, by Helen M. Parker, executrix, Shaker Heights, Ohio, assignor to The Parker Appliance Company, Cleveland, Ohio, a corporation of Ohio Continuation of application Serial No. 486,862, May 13, 1943. This application June 5, 1946, Serial No. 674,424

3 Claims. (Cl. 277—20)

The invention relates to certain new and useful improvements in sump selector valves adapted for use in fuel supply tanks of aircraft in the manner disclosed in U. S. Letters Patent 2,332,007, issued to Arthur L. Parker October 19, 1943.

In an airplane the fuel supply tank is mounted fixedly relative to the frame structure in such position that the longitudinal axis of the tank will be disposed substantially horizontally when the airplane assumes level flight. When the airplane is at rest on the ground, the tank is tilted upward so that the fuel lies at the back end of the tank, and the tank will remain tilted until the airplane has reached the desired altitude and assumes a level flight. During flight, the tank will be tilted more or less as the airplane moves upward or downward and during banking in the making of turns. In order to avoid the delivery of air into the engine fuel lines as a result of uncovering of a line inlet in the tank due to tilting of the tank, there is provided a plurality of fuel dispensing pipes which terminate adjacent the ends of the tank, or at widely spaced points in the tank, with which pipes is associated a sump selector valve mounted for tilting movement with the tank and which is so disposed that gravity-actuated valves therein will control the dispensing pipes whereby fuel will be supplied solely from the pipe leading to the lowermost position in the tank during its tilting movements.

An object of the invention is to provide in a sump selector valve of the character stated wherein are provided longitudinally spaced, rollably mounted ball valves cooperating with seats for suitably controlling flow of liquid fuel through the valve upon tilting thereof, a novel baffle arranged between the ball valves to prevent direct impingement of the incoming liquid fuel with the ball valve which is seated, preventing the ball valve from being unseated and eliminating chattering and at the same time permitting free flow of the liquid fuel past the unseated ball valve.

A further object of the invention is to provide in a valve structure of the character stated wherein is included a baffle arranged between the ball valves, a member mounted to swing in a slot in the baffle and having projections therefrom so proportioned and placed relative to the ball valves and the seats with which they are engageable as to prevent simultaneous seating of both valves.

A further object of the invention is to provide a valve structure of the character stated wherein the baffle upon which the swingable ball engaging member is supported is carried by a closure member removably mounted in an opening in the casing disposed opposite the casing outlet.

With the above and other objects in view that will hereinafter appear, the nature of the invention will be more fully understood by following the detailed description, the appended claims and the several views illustrated in the accompanying drawing.

In the drawing:

Figure 1 is a central longitudinal section illustrating the improved valve structure.

Figure 2 is a central vertical cross section of the valve structure illustrated in Figure 1, the center baffle being shown in elevation.

Figure 3 is a vertical cross section of the valve casing per se taken through one ball chamber thereof and looking toward the center of the casing.

The sump selector valve structure in which the invention is incorporated comprises a casing 5 which is generally cylindriform in shape and open at both ends. The casing is provided centrally of its length with an outlet opening 6 which is disposed perpendicularly with respect to the longitudinal axis of the casing and opens downwardly in the manner clearly illustrated in Figure 1. Inlet openings are provided in the respective ends 7 of the casing, and within each end of the casing is formed a ball valve chamber 8, and a central flow chamber 9 is disposed in the center of the casing between said ball chambers and communicating therewith through circular openings 10.

It is to be understood that the respective ends 7 of the casing are adapted to be connected by ducts or pipe lines with the fuel tank of an airplane, said pipes or ducts opening into the tank at spaced points so that one at least thereof always will be connected with the fuel supply whereas the other may be open at times to air in the tank in the manner clearly disclosed in U. S. Letters Patent 2,332,007 issued to Arthur L. Parker, October 19, 1943, and hereinbefore referred to. The outlet opening 6 is adapted to be connected by a pipe or conduit with the booster pump usually provided, and through said pump with the engine to be supplied with fuel.

The casing wall in which each fuel supply or seat opening 10 is formed is provided endwise with an annular seat structure generally designated 11. Within each ball chamber 8 is provided a plurality of circumferentially spaced guide ribs 12 which are disposed parallel the axis of the casing and serve as guides for the ball valves 13 which are rollably mounted in the respective chambers. By reason of the particular mounting of the balls in the manner described and clearly illustrated in Figures 1 and 3, it will be obvious that as the valve structure is tilted, the ball in one of the chambers 8 will roll away from the cooperating seat and provide a liquid fuel passageway about the ball, through the respective seat opening 10 and to the outlet 6, and the ball in the other chamber 8 will roll against the cooperating seat 11 and close the respective seat opening 10.

At its central portion, directly over the outlet opening 6, the casing 5 is provided with an opening 14 which is closed by a removably mounted closure cap 15, said cap being secured fluid-tight against a recessed gasket 16 in the manner clearly illustrated in Figures 1 and 2. The cap includes a center boss or plug extension 17 which depends in the casing opening 14, said boss being provided with a depending center baffle 18 which is slightly wider than the diameter of the casing openings 10 and is rounded as at 19 at its lower extremity on an arc the radius of which is slightly greater than the radius of said openings 10. The baffle 18 is provided with a centrally longitudinally disposed slot 20 and a pendulum member 21 is pivotally mounted as at 22 in said slot. The pendulum member is provided at its upper end with shoulders 23 effective to limit swinging movement of the member in the central vertical plane including the axis of the casing, and at its lower end the pendulum member 21 is provided with endwise extensions 24 which include arcuate end faces 25 disposed along the center of the casing in position for contacting the ball valves 13 in the manner clearly illustrated in Figure 1. It will be observed by reference to Figure 1 that the pendulum member extensions are so spaced that they will engage with the ball valves 13 and prevent seating of both balls at any given time.

In order to prevent direct, full force impingement of incoming fuel with the ball valves 13, an inlet baffle 26 is mounted at each end of the casing in the manner clearly illustrated in Figure 1. Each inlet baffle includes a convex center portion conforming generally to the curvature of the adjacent portion of the respective ball valve, and is equipped with a plurality of outer openings 27 disposed adjacent the diametric limit of the adjacent ball, and also with a center opening 28 of limited area which permits a limited amount of direct impingement of incoming fuel with the respective ball valve 13 and not objectionable full force impingement such as would cause the ball to partake of violent, uncontrolled movements in its chamber.

The present invention is directed to the center baffle 18, the pendulum member 21 and the novel mounting of these parts. The specific seat structures and inlet baffles form no part of the present invention, and are covered in the copending application for U. S. Letters Patent of Joseph F. Melichar and Wilton Margrave filed May 13, 1943, Serial Number 486,862, the present application constituting a continuation of said copending application.

The partition or center baffle 18, proportioned in the manner stated, covers the valve seat openings 10 in a manner for diverting or guiding the incoming liquid fuel passing either ball valve 13 laterally and downwardly through the outlet opening 6. In this manner, the incoming fuel will not impinge upon the seated ball valve and tend to unseat the same. While the center baffle 18 thus prevents the incoming liquid fuel passing one unseated ball valve 13 from directly engaging and effecting an unseating of the other seated ball valve, yet it does not obstruct the proper and free flow of the incoming liquid fuel through the unseated ball valve associated seat to the outlet opening 6.

It is to be understood that the form of the invention herein shown and described is to be considered as a preferred example of the same and that various changes in the shape, size and arrangement of parts may be resorted to without departing from the spirit of said invention or the scope of the appended claims.

What is claimed is:

1. An elongated valve casing having inlet openings at its ends and an outlet opening intermediately of its ends, a central flow chamber leading to said outlet opening and a valve chamber in each end for receiving fluid through the respective inlet openings, a ring seat between each valve chamber and the central flow chamber, a freely rolling ball in each valve chamber adapted to roll by gravity toward and from the respective seat, a wall traversing the flow chamber centrally between said ring seats, a spacer member swingably mounted in the central flow chamber and having ball engaging portions disposed for engaging between the balls so as to permit seating of one ball at a time and never both balls, and a baffle disposed centrally at each inlet opening in position for deflecting incoming fluid around the respective ball.

2. An elongated valve casing having inlet openings at its ends and an outlet opening intermediately of its ends, a central flow chamber leading to said outlet opening and a valve chamber in each end for receiving fluid through the respective inlet openings, a ring seat between each valve chamber and the central flow chamber, a freely rolling ball in each valve chamber adapted to roll by gravity toward and from the respective seat, a baffle wall traversing the flow chamber centrally between said ring seats, and a spacer member mounted to swing as a pendulum in an upright plane including the axis of the casing and having ball engaging portions disposed for engaging between the balls so as to permit seating of one ball at a time and never both balls.

3. A structure as defined in claim 2 in which the casing is provided with an opening opposite the outlet opening, and in which there is included a removably mounted closure for said opening which serves as a removable mounting for the baffle wall.

HELEN M. PARKER.
*Executrix of the Estate of Arthur L. Parker,*
*Deceased.*